（12）United States Patent
Holmquist et al.

(10) Patent No.: US 9,729,591 B2
(45) Date of Patent: Aug. 8, 2017

(54) GESTURES FOR SHARING CONTENT BETWEEN MULTIPLE DEVICES

(71) Applicant: Yahoo! Inc., Sunnyvale, CA (US)

(72) Inventors: Lars Erik Holmquist, San Francisco, CA (US); Karolina Buchner, San Jose, CA (US); Roger Urrabazo, Gilroy, CA (US); Roman Lissermann, San Francisco, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 467 days.

(21) Appl. No.: 14/313,035

(22) Filed: Jun. 24, 2014

(65) Prior Publication Data

US 2015/0373065 A1    Dec. 24, 2015

(51) Int. Cl.
*G06F 3/0488* (2013.01)
*H04L 29/06* (2006.01)
*G06F 3/0484* (2013.01)
*G06F 3/0487* (2013.01)
*G06F 1/16* (2006.01)
*G06F 3/01* (2006.01)

(52) U.S. Cl.
CPC .......... *H04L 65/403* (2013.01); *G06F 1/1694* (2013.01); *G06F 3/017* (2013.01); *G06F 3/0487* (2013.01); *G06F 3/0488* (2013.01); *G06F 3/04842* (2013.01); *G06F 3/04883* (2013.01); *H04L 65/60* (2013.01)

(58) Field of Classification Search
CPC ....... H04L 29/06; G06F 3/0488; G06F 3/0484
See application file for complete search history.

(56) References Cited

U.S. PATENT DOCUMENTS

| | | | | |
|---|---|---|---|---|
| 2013/0080525 A1* | 3/2013 | Aoki | ........................ | H04L 67/26 709/204 |
| 2013/0290845 A1* | 10/2013 | Rudman | ............... | G11B 27/034 715/716 |
| 2014/0033134 A1* | 1/2014 | Pimmel | ............... | H04L 67/1074 715/863 |
| 2014/0250193 A1* | 9/2014 | Goncalves | ............ | H04W 4/206 709/206 |
| 2014/0282066 A1* | 9/2014 | Dawson | .............. | H04L 65/4038 715/748 |
| 2014/0282106 A1* | 9/2014 | Smith | ............... | G06F 17/30165 715/753 |
| 2014/0365542 A1* | 12/2014 | Lin | .................... | G06F 17/30194 707/827 |

(Continued)

*Primary Examiner* — David Choi
(74) *Attorney, Agent, or Firm* — Martine Penilla Group, LLP

(57) ABSTRACT

Methods and systems for sharing content includes detecting selection of multimedia content at a first device. The selection causes automatic rendition of the selected multimedia content on a display portion of the first device. Selection of a second device is detected at a user interface of the first device. The user interface identifies a plurality of devices that have an established communication pairing with the first device. A gesture made with the first device while the second device continues to be selected, is identified. The gesture acts as a trigger for sharing the selected multimedia content with the second device. The gesture causes the multimedia content to be automatically transmitted to the second device for rendering at a display portion of the second device.

19 Claims, 10 Drawing Sheets

Hold & throw

(56) References Cited

U.S. PATENT DOCUMENTS

| | | | |
|---|---|---|---|
| 2015/0052454 A1* | 2/2015 | Cai ..................... | H04M 1/6066 715/753 |
| 2015/0177866 A1* | 6/2015 | Hwang .................. | G06F 3/042 345/175 |
| 2015/0373065 A1* | 12/2015 | Holmquist ............ | H04L 65/403 715/753 |

* cited by examiner

GESTURES FOR SHARING CONTENT BETWEEN MULTIPLE DEVICES

BACKGROUND

Field of the Invention

The invention relates generally to ways to share content, more particularly, to sharing media content across television and a plurality of mobile devices.

Description of the Related Art

Although television has been around for a number of years, television watching has evolved over recent years. Watching television was and is a highly social experience with people physically gathering around the television for viewing major televised event, news, etc. Lately, increasing number of users bring their mobile devices with them when gathering around to watch the television. Oftentimes, these users use their mobile devices, while watching television, to consume content, which may or may not be related to the program being viewed by the group that is gathered together. Such content may include email content, social media updates or content that may not be shared publicly.

With the ubiquitous nature of the mobile computing devices, watching and sharing content with one another has taken on a whole new meaning. Traditionally, when a first user wishes to share content that he/she is watching with other users, he/she provides a link to the content in an email, in a social media stream, in a text message, etc., so that the other users may access the link to watch the shared content. The traditional way of sharing the content using links are asynchronous and lack directional specificity. In other words, the traditional way required a second user to wait for the link shared by a first user in order to access the content. It would be advantageous to be able to share content with other users in a novel way to make the television watching experience more enjoyable and enriching.

It is in this context that the embodiments of the invention arise.

SUMMARY

Embodiments of the disclosure provide ways for users to share multimedia content with other users. An application tool provides the programming logic to detect mobile devices that are paired with one another and with a main device, such as a television, and to provide an interface that allows users to consume and share content with each other. For example, the application allows users to share television content, social media content and/or other content with a set of users either privately through their mobile devices or publicly on a television. The set of users may be either co-located or remotely located. The content that can be shared privately or publicly may include live video streams (synchronously), web video (asynchronously), web content (for e.g., news articles, images, weblogs, etc.), social media streams (individual content or streams of contents), video games, etc. An interface provided by the application tool allows a first user to select either a device or a second user for sharing content and perform a gesture. The application tool detects the selection of the device/the second user, interprets the gesture made with a user's device and transfers content from the user's device to the second user's device or from the second user's device to the user's device for automatic rendering, based on the gesture. In other words, the gestures are interpreted to determine if content needs to be retrieved from a selected device or content needs to be sent to the selected device. Of course, the content that is transferred is multimedia content that is shared for private or public viewing depending on the device selected. The various embodiments that will be described herein provide the ability to connect different co-located and remotely located devices across geography making this a robust and virtual, collaborative content sharing tool. The content may be shared with a single device or a group of devices belonging to a single user/a group of users, wherein the device may be a mobile device or a main device, such as a television.

It should be appreciated that the present embodiments can be implemented in numerous ways, such as a process, an apparatus, a system, a device, or a method on a computer readable medium. Some of the exemplary embodiments are described below.

In one embodiment, the present invention provides a method for sharing content with other users. The method includes detecting selection of multimedia content at a first device. The selection causes automatic rendition of the selected multimedia content on a display portion of the first device. Selection of a second device is detected at a user interface of the first device. The user interface identifies and renders a plurality of devices that have an established communication pairing with the first device. A gesture made with the first device while the second device continues to be selected, is identified. The gesture acts as a trigger for sharing the selected multimedia content with the second device. The gesture causes the multimedia content to be automatically transmitted to the second device for rendering at a display portion of the second device.

In one embodiment, the selection of the second device is through selection of an icon from a plurality of icons available at the first device. Each of the plurality of icons represents one of a distinct second device, a user associated with the distinct second device, a group of distinct second devices, or a group of users associated with the distinct second devices that have established communication pairing with the first device.

In one embodiment, the multimedia content selected for sharing includes any one or combination of multimedia content provided by one or more content providers, multimedia content generated and shared by the user initiating the selection of second device, multimedia content generated and shared by one or more other users, or any combinations thereof.

In one embodiment, each of the plurality of icons is associated with a selection indicator, such that the selection of the icon from the user interface causes the selection indicator of the icon to be activated for duration of the selection.

In one embodiment, a share indicator at the first device is updated in response to sharing of the selected multimedia content with the second device.

In one embodiment, the share indicator is provided in any one of a haptic format, a textual format, a radio or check box format, an audio format, a static image format, an animated image format, or any combinations thereof.

In one embodiment, the first device is a mobile computing device.

In one embodiment, the second device is one of a television used for rendering the selected multimedia content publicly or a mobile computing device used for rendering the selected multimedia content privately.

In one embodiment, the attributes of the multimedia content are defined for private sharing.

In one embodiment, the attributes of the multimedia content are defined for public sharing.

In one embodiment, the communication pairing between the first device and the second device is established using a streaming protocol.

In one embodiment, the gesture is a throw gesture.

In one embodiment, an option is provided to un-share the multimedia content that is shared with the second device.

In one embodiment, a method for sharing multimedia content is disclosed. The method includes detecting multimedia content being rendered on a display portion of a first device. Selection of the first device is detected at a user interface on a second device. The second device includes a user interface identifying a plurality of devices with which the second device has established communication pairing. A gesture is made with the second device while the first device continues to be selected at the user interface of the second device, is detected. The gesture acts as a trigger for retrieving the multimedia content currently rendering on the first device. The multimedia content retrieved from the first device is automatically rendered at a display portion of the second device.

In one embodiment, the gesture is a pull or a grab gesture.

In one embodiment, the first device is a television or a mobile computing device.

In one embodiment, the second device is a mobile computing device.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Figure 1:
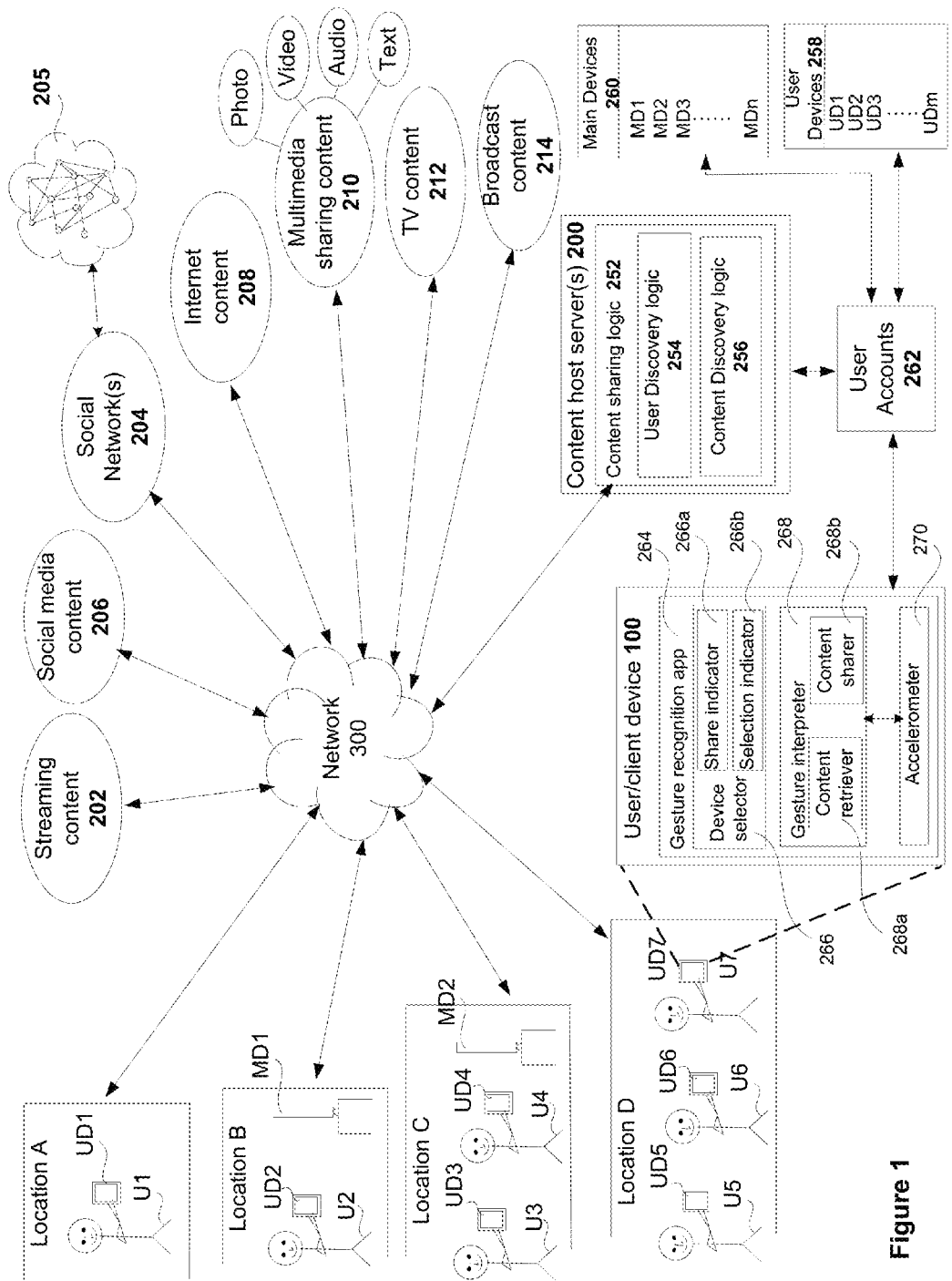
FIG. 1 illustrates a simple block diagram of a system that is used for sharing multimedia content, in accordance with an embodiment of the present invention.

Embodiments of the present invention provide system, computer readable media storing an application with program instructions, and methods for sharing multimedia content rendering on a first device, with a second device. The first device could be a main device, such as a television, desk top computing device, etc., or a mobile computing device, such as a smart phone, personal digital assistant (PDA), tablet personal computer, laptop computing device, etc., associated with either a single user or a plurality of users. The various embodiments define a user interface on a device (for e.g., mobile device) that allows users to select multimedia content for rendering and sharing with other devices. A user can share the content publicly with all the users by sharing the multimedia content rendering on his/her mobile device, on the main device, or privately with select ones of the users by sharing the content with other mobile devices. The content may include live video streams streaming synchronously, web video streaming/transmitting asynchronously, web content (such as news articles, images, weblogs, etc.), social media streams (for e.g., social media content, social media updates, etc.) or any other multimedia content that can be accessed, rendered, viewed and shared.

An application, such as a gesture recognition application, detects selection of multimedia content by a user at the user's device, identifies a gesture performed by the user with the user's device, interprets the gesture and determines if the multimedia content needs to retrieved from another user's device or shared with another user's device(s). The two devices involved in content sharing may be co-located or remotely located. The application provides an intuitive way of sharing content using gestures rather than explicit links, etc., to encourage collaborative viewing. The content includes any multimedia content that can be accessed over a network, generated, retrieved, rendered and shared. The various embodiments may also be used in an intuitive way in video game play using gestures wherein a first user may access a collaborative video game, make his move, and "toss" or "throw" it over to a second user who can make his move and toss/throw it back. This back-and-forth moves can make for interesting gameplay.

In order for the application to be able to detect selection and interpret gesture for sharing content, the devices have an established communication pairing with each other. A pairing tool/application within a device may be used to detect devices that are near the device, (for e.g., either a main device or other mobile devices) and establish communication pairing with the detected devices. For example, a mobile device may be paired with the main device when the mobile device comes within a communicative distance of the main device. The pairing may be automatic without explicit request from a user or could be explicitly established by user actions. In some embodiments, the pairing may be established during initialization of the mobile device or the main device. In some embodiments, the pairing is accomplished using a protocol, such as a "Device Communication" protocol. The protocol is not restricted to the aforementioned protocol and that other protocols may be used to pair the mobile devices with one another and with the main device(s). If the pairing has already been done, the system detects the pairing of the mobile devices with other mobiles devices and with the main device(s). Once the devices are paired, content accessed and viewed on one device may be shared with other devices, wherein the devices that the content is viewed and/or shared with could be a main device or a mobile device, such as a mobile computing device, smart phone, PDAs, tablet PCs, etc. In one embodiment, the content can be privately shared with select ones of the users and such private sharing can be accomplished by sharing content between the mobile devices of the users. Similarly, the content can be shared publicly with other users and such public sharing can be accomplished by sharing content on a main device. In one embodiment, content selected for sharing privately or publicly may be generated by a user on the user's mobile device and shared with other users on their mobile devices and/or on their main devices. In one embodiment, the other users that are selected for sharing multimedia content may be users that are socially connected to a user initiating the sharing and the social connections may be obtained from social graphs defined in a social network of one or more social media content providers. In another embodiment, the other users that are selected for sharing multimedia content may be users that are not socially connected to a user initiating the sharing but share the same interest in the multimedia content viewed by the initiating user. For more information related to the pairing of devices, reference can be made to U.S. Provisional Application No. 61/924,704, filed on Jan. 7, 2014, and entitled "Interaction with Multiple Connected Devices," which is incorporated herein by reference in its entirety.

The sharing can be done using gestures provided with the devices. For example, a user may select to retrieve content from a second device, such as another mobile device or a main device, and provide an appropriate gesture with a first device. The gesture is interpreted at the first device and a request for the content is made to the second device. Upon successful retrieval of content from the second device, the content is automatically rendered at the first device. Alternately, a user may select to share content with a second device and provide a gesture with the first device. The gesture is interpreted at the first device and the content is shared with the second device. The sharing causes automatic rendering of the content at the second device. The sharing or retrieval of content may be performed through appropriate application programming interface (API) within the two devices.

With the general understanding of the invention, detail description of the various embodiments will now be described with reference to the drawings.

FIG. 1 illustrates a system that is used for sharing multimedia content amongst one or more mobile devices and between the mobile devices and a main device, wherein each of the devices are communicatively paired with the other devices, including with one or more main devices and one or more mobile devices. The communicative pairing may be performed during initialization of the respective devices and pairing may be maintained over time. In one embodiment, after the initial pairing of the devices, options may be provided at the respective devices to pair/un-pair the devices from one another. Each of the mobile devices and the main devices associated with a plurality of users are configured to connect to a network 300, such as the Internet, through wireless or wired connection to interact with each other and with a server device 200, such as a content host server, content accumulator server, cloud game server, cloud content server, promotional content server, etc., to access multimedia content for viewing and sharing.

Continuing to refer to FIG. 1, a mobile device UD1 is associated with User U1 at location A. Similarly, a mobile device UD2 and a main device MD1, such as television, are associated with user U2 at location B. Mobile devices UD3, UD4 and a main device MD2 are associated with users U3 and U4, respectively, at location C. Mobile devices UD5, UD6 and UD7 are each associated with users U5, U6 and U7, respectively, at location D. Each of the users may access and/or share the content provided by one or more servers 200 or content shared by one or more users, using their mobile device(s) from their respective location. Each of the users may also share content created at their own devices (i.e., mobile or main devices) with other users and with one or more main devices. The embodiment illustrated in FIG. 1 is exemplary with each user being associated with one mobile device and/or one main device. It should be noted that each user may be associated with more than one mobile device and more than one main device.

Each of the mobile devices and the main devices associated with the plurality of users run a portion of the content sharing application that communicates with the content host server 200, on which the main content sharing application logic is running. In one embodiment, the portion of the content sharing application on the mobile devices and the main devices are specific to the respective type of mobile/main devices. The device portion of the application on the mobile devices receives content shared by other users for private viewing, renders the respective users private view and handles notifications to the users when content are shared by different users privately. The device portion of the application on the main device renders the content that was shared by users for public view and handles notifications of which content has been shared with other users publicly. In some embodiment, every time a multimedia content is shared on the main device, the content is shared for public view and a notification may be sent to other users in either the respective initiating user's social network or those whose mobile devices that have established pairing with and are in the vicinity of the main device to inform these users that new content is being shared publicly so as to draw the attention of these users back to the main device for collaborative TV watching. Toward this end, the device-side application at each of the mobile and main devices provide the appropriate interface to enable the respective device to access, view, share multimedia content and to interact with other main/mobile devices. Additionally, the device-side application on the mobile devices is configured to enable generation of content, such as photos, images, annotations, etc., on the respective mobile devices and to enable sharing of the generated content with other users privately on the corresponding mobile devices or publicly on the main devices.

In some embodiment, the mobile device side application may be a mobile application through which the user can access the content for viewing and sharing with other users on the respective main or mobile devices associated with other users. The mobile device application, in conjunction with the server-side application may be able to discover friends or other people that are viewing content similar to the content selected for rendering on the mobile device, and may provide such information in the form of social contact information to the user on the mobile device. In addition to browsing for content, the application on the mobile devices may be used to browse the internet for auxiliary content related to the content rendered on a main device or auxiliary content that the user wishes to share with one or more users, retrieve the auxiliary content information and enable sharing of the auxiliary content information with one or more users privately or publicly. In addition, the application on the mobile devices may be used to generate content, such as annotations, photos, etc., and share such content with other users.

In addition to the content sharing application, each of the mobile devices is equipped with a gesture recognition application. In one embodiment, the gesture recognition application may be integrated into the content sharing application provided at each of the mobile devices. The gesture recognition application at a first device is used to detect selection of a second device or a user of a second device at a user interface rendered on the first device, detect a gesture provided with the first device while the second device continues to be selected at the user interface, interpret the gesture and, based on the interpreted gesture, either share content rendering on the first device or retrieve content from the selected second device. The first device may be a mobile device and the second device may be another mobile device or a main device that is either co-located or remotely located. In order to allow device selection, the user interface provided at the first device may provide icons of other devices or icons of users associated with the other devices that are communicatively paired with the first device. In one embodiment, the content sharing logic may detect and identify the second device selected for content sharing at the user interface and the gesture recognition application interprets the gesture provided with the first device.

The server 200 may be a host content server that provides the multimedia content or may be a content accumulator that receives content from a plurality of sources, such as streaming content 202 from a content provider, social contact information from a social network 204 that provides contact information for a plurality of users based on their respective social graphs 205, social media content 206 from one or more social media content providers, internet content 208 from internet content providers, multimedia content 210 (such as photo, video, audio, etc.) for sharing from multimedia content providers (including users), Television content 212 from cable and network providers, broadcast content 214 from various individual and network broadcast providers. The above list of content sources is exemplary and other content sources may also be providing content or making the content available to the content accumulator server, such as the host server 200.

The host server 200 includes a server-side content sharing logic 252 that is configured to detect pairing of devices (if already paired) or provide interface to pair the devices, such as the mobile devices and main devices. The server-side content sharing logic 252 is also configured to provide content from the various sources for viewing and sharing, identify social contact of users to share the content with and enable sharing of the content with one or more users either publicly or privately. The content sharing logic includes user discovery logic 254 to keep track of which users devices (both mobile and main devices) are communicating with the server when requesting multimedia content, what multimedia content has been requested for watching on each of the mobile devices and the main devices, what multimedia content the users want to share with other mobile devices or main device. The server application then provides the appropriate content for rendering on either the publicly viewable display screen associated with the main device or the display screen of the privately held mobile device.

Toward this end, the user discovery logic identifies the user identification information, including the user identifier, user attributes, etc., for the user(s) associated with each of the mobile devices and the main devices. The user discovery logic 254 then uses the identification information to query the user device mapping table 258 and the main devices mapping table 260 to identify the one or more mobile devices and the one or more main devices that are mapped to user identifier/identification information. In one embodiment, the user discovery logic is configured to obtain the user identifier and user attributes by accessing the user account information 262. In one embodiment, the user account information may be provided by the user during initialization of the mobile device/main device and such information may be stored in the respective mapping tables 258, 260. In addition to identifying the devices associated with a user, the user account information from the mapping tables may be used to determine the multimedia content that is available to the user from different content sources. For example, the content available to the user from different content sources may be based on the user's subscription. The multimedia content provided by the server includes any content including content from a cloud-based system.

A content discovery logic 256 within the content sharing logic 252 receives the information from the user account and identifies the content (e.g., multimedia content) that is available to the user based on the user account information. The term "logic" used throughout this application refers to instructions provided within an application. The content may also include content available on the internet, content generated by the user, and content provided by one or more content sources that the user has subscribed for or is able to access. Toward this end, the content discovery logic 256 is configured to interact with the various content sources over the network 300 to identify and retrieve the appropriate content for the user based on the user account information, package the content according to communication protocol used to communicate between the secondary/main devices and the server, and transmit the packaged content to the respective mobile devices and the main devices associated with the users using the communication protocol, for rendering.

Figure 2:
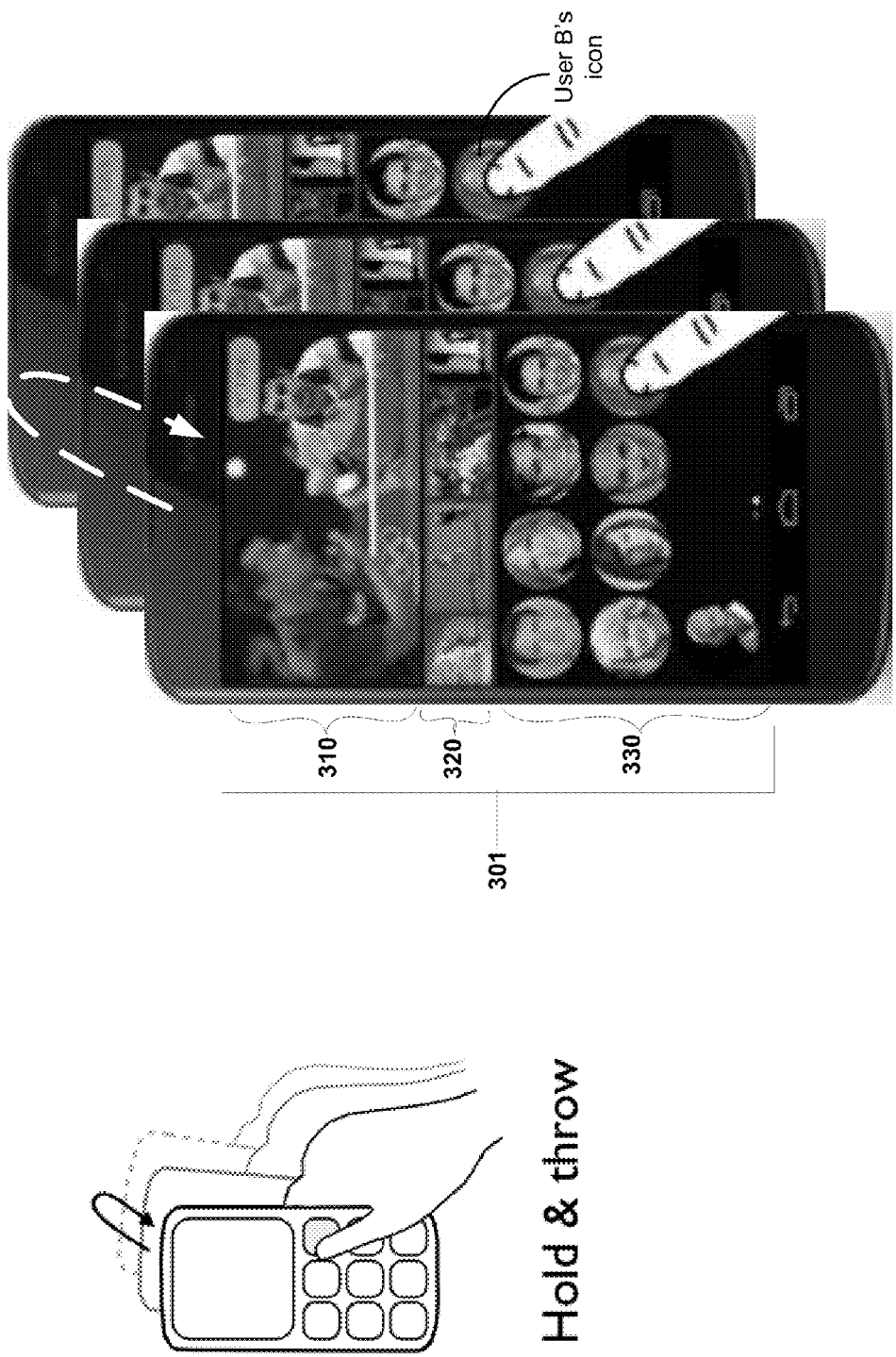
FIG. 2 illustrate an exemplary "hold-and-throw" gesture performed at a user's device, in accordance with one embodiment of the present invention.

The packaged content is received, interpreted and rendered at the mobile device. In one embodiment, the user interface of the mobile device includes three main regions for rendering and sharing content. FIG. 2 illustrates an exemplary screen rendition of the user interface on a mobile device 301 of a user identifying the three main regions and the information rendered in the respective regions. The first main region or primary region is the top region 310 of a display screen available on the mobile device 301. The top region 310 acts like a mini-TV screen rendering the selected multimedia content. A user may be able to browse multimedia content available on or accessible from the mobile device and view the selected content privately.

Below the first main region, is the second region 320 on which available multimedia content is rendered. In one embodiment, the multimedia content accessed from the mobile device may be content shared by other users publicly/privately, content available to the user based on the user's subscription to content, content obtained from the Internet, content created by the user, content retrieved from a main device, etc., and is presented on the mobile device as carousel of thumbnails in the second region 320. User input, such as selection, at any of the multimedia content presented in the second region 320 will cause the selected multimedia content to be automatically rendered in the top region 310 of the mobile device from where the content is shared. Any of the multimedia content available within the carousel of the mobile device may be shared with a main device for public viewing or with other mobile devices for private viewing. In one embodiment, when the content is shared with other devices, the selected content is automatically rendered in the display portion of the shared device. In another embodiment, instead of automatically rendering the shared content, information related to the shared content is rendered on the display portion of the shared device(s). The information may include an identifier of the user sharing the content, information about the content, etc. In addition to the information, a request may also be provided to the user of the shared device informing the user about the shared content. The request may be in the form of an informational text message. The informational message is one form of a share indicator used to inform a user of content being shared and that other forms of share indicator may be used. The share indicator may include an icon of the sharing user. When the shared device is a main device, the content shared by a user may be provided as a thumbnail and the sharing user may be able to manipulate the size of the display of the multimedia content to full or largest display in the main screen. In one embodiment, the content may include other content, such as images, videos, audio streams, pictures, photos, annotations, etc., captured or generated on the mobile device. The sharing user may have the ability to un-share a specific multimedia content from public or private viewing by deleting the corresponding thumbnail from the carousel bar of the device from which the sharing user is sharing content, etc.

Below the second region 320 is the third region 330 with a grid of icons. Each icon in the grid identifies a mobile device, a main device, a group of devices (mobile and/or main devices), an image of a user of a mobile and/or main device, or an image/icon representing a group of users associated with mobile and/or main devices, wherein the corresponding device(s) have established communication pairing with the mobile device of the sharing user. The user of the mobile device may select content for rendering on a display portion of the user's mobile device.

In one embodiment, after the user of the mobile device has selected the content for rendering on the display portion, the user may opt to share the content with one or more of other users on their mobile devices and/or main device(s). For sharing the content, the sharing user may select an icon from the grid portion 330 and perform a gesture, such as a "throw" gesture, with the user's mobile device, while continuing to select the icon, as illustrated in FIG. 2. The throw gesture may be similar to the throwing of a fishing line. In one embodiment, a device selector module 266 within a gesture recognition application 264 detects user selection of an icon from the grid and identifies the device/user associated with the selected icon. The device selector module 266 may then interact with the user devices data store 258 and/or the main devices data store 260 to obtain information of the selected device/user, including type of device, amount of display space available, etc.

In one embodiment, in response to the user selection, one or more indicators may be activated. For example, a selection indicator module 266b may use the information of the selected icon and activate appropriate selection indicator for the selected icon on the user interface rendered on the sharing device. The activation of the selection indicator may be in the form of providing a distinctive lighting at the selected icon, providing haptic feedback to the sharing mobile device, a textual message informing a user of the device selected for sharing, etc. The above list of selection indicator format is exemplary and should not be considered restrictive. Other forms of selection indicators may be employed for informing the sharing user.

Figures 5A, 5B:
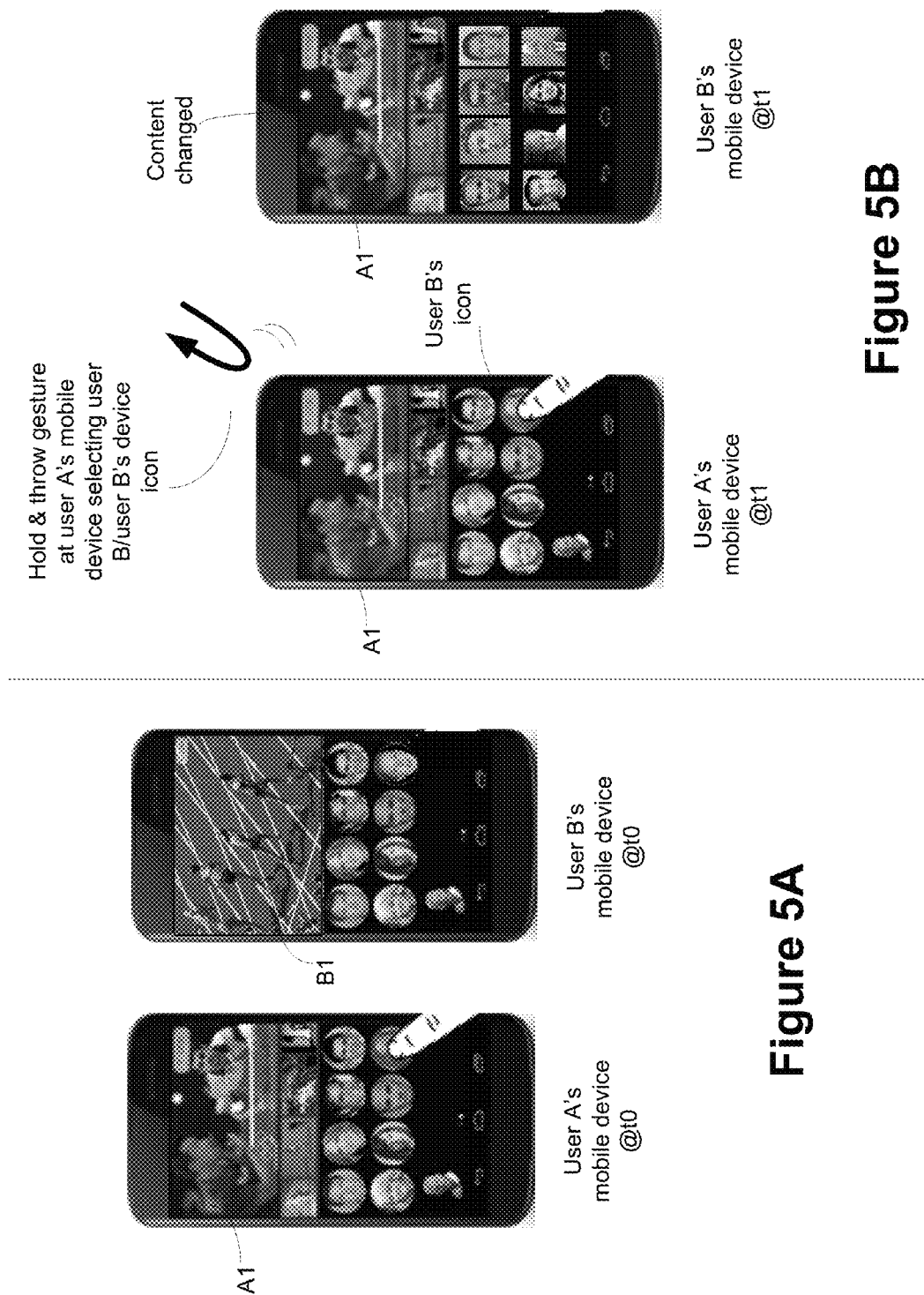
FIGS. 5A and 5B illustrate an exemplary screen rendition related to sharing of content between mobile devices of two users, in accordance to an embodiment of the invention.

Once the shared device is identified, the information is passed to a gesture interpreter module 268. The gesture interpreter determines the type of gesture detected at the mobile device of the sharing user. When the gesture interpreter determines that the gesture is a throw gesture, the gesture interpreter activates the content sharer module 268b for sharing the content with the shared device. The content sharer module 268b acts with the content discovery logic 256 to determine the content that is being shared and transmits the content to the sharing device. The transmission of the shared content may be done through the application programming interface of the respective sharing and shared devices. FIGS. 5A and 5B illustrate the before and after screen rendition of a sharing mobile device and a shared mobile device, in response to the sharing of content initiated from a user's mobile device. For example, as illustrated in FIG. 5A, user A's mobile device is rendering content A1 related to a boxing match, at time t0. At the same time, time t0, user B's mobile device may be rendering different content B1 (for e.g., a Olympic relay run). At time t1, user A elects to share his/her content with user B and so makes a "hold-and-throw" action/gesture at User A's mobile device. In the hold-and-throw action, user A first selects the icon representing an image of either user B or user B's mobile device and performs a throw gesture while continuing to select the icon associated with user B's mobile device. The selection of the icon and the throw gesture are detected by the gesture recognition application 264, the gesture is interpreted as a share gesture and the shared content A1 is transmitted to user B's mobile device. User B's mobile device receives the transmitted content A1 shared by user A and may automatically begin to render the shared content A1 on a main/primary display portion 310, as illustrated in FIG. 5B. In an alternate embodiment, the content A1 transmitted by user A may be received at user B's mobile device and, in response, an informational message may be rendered on the main display portion of user B's mobile device informing user B about the content A1 shared by user A. In this embodiment, user action may be required at user B's mobile device in order for the content A1 shared by user A to be rendered at the main portion of user B's mobile device. In one embodiment, in response to receiving the shared content A1, a share indicator may be activated at user B's device. For example, user A's icon in user B's user interface may be illuminated to provide a visual indication that user A has shared content A1 with user B. Alternately, an audio message or haptic feedback, textual message, image of user A sharing the content, etc., may be provided at user B's mobile device indicating receipt of shared content and the user A sharing the content. A share indicator module 266a within the device selector module 266 may detect the receipt of shared content A1 at user B's device and activate the appropriate user icon's share indicator at user B's device. Along similar lines, the share indicator module 266a in user A's device may detect the transmission of the shared content A1 to user B's device and activate the appropriate share indicator of user B at the user A's device. In one embodiment, the share indicator on user A's mobile device may be in the form of highlighting an image of user B with whom the content was shared. It should be noted that the content that is shared is marked for sharing.

Figure 6A:
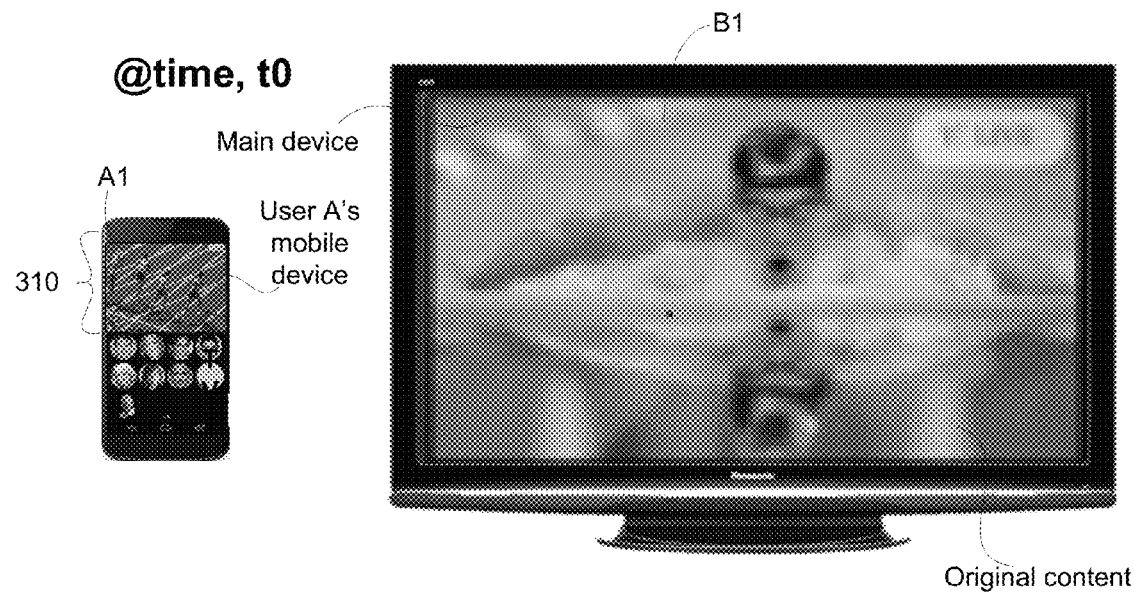
FIGS. 6A and 6B illustrate an exemplary screen rendition related to content sharing from a mobile device to a main device, in accordance to an embodiment of the invention.
Figure 6B:
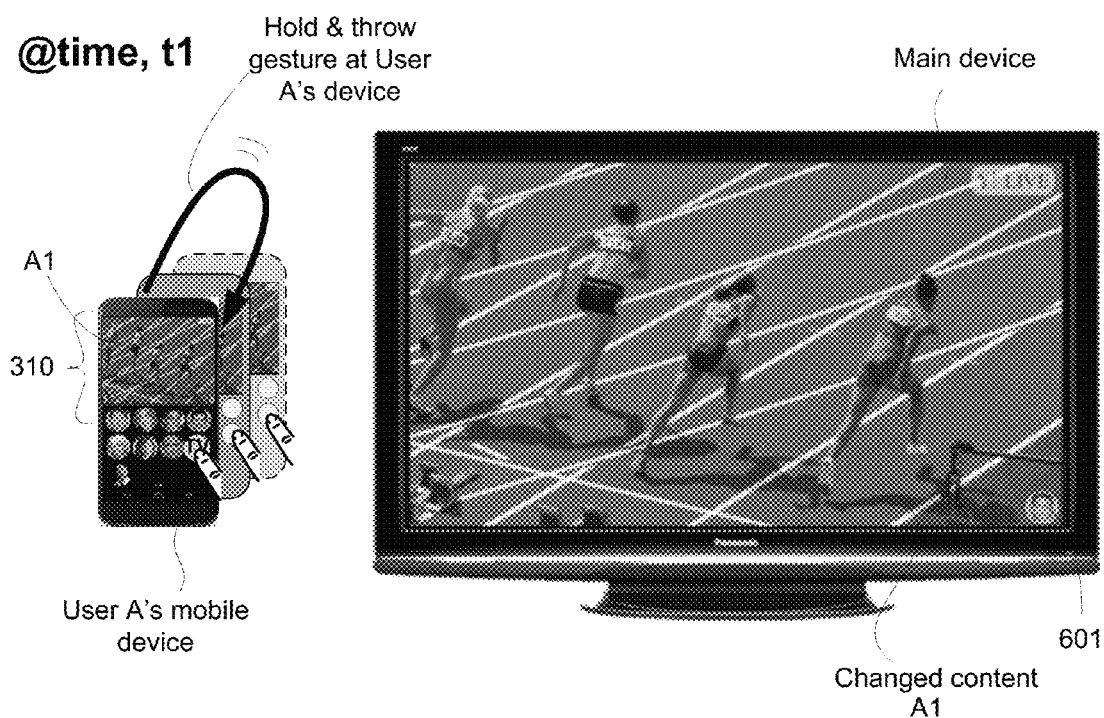

In another embodiment, the content from a mobile device of a user can be shared with a main device. FIGS. 6A and 6B illustrate a before-and-after screen rendition of such an embodiment. FIG. 6A illustrates the content that is being rendered on a mobile device of user A and a main device that is paired with the mobile device of user A, at time t0. As illustrated, user A's mobile device is rendering the content A1 related to Olympic relay race and the main device is rendering the content B1 related to Olympic free-style swimming competition. At time t1, user A elects to share content rendering on his/her mobile device with the main device by selecting the icon identified by "TV" and performing a hold-and-throw gesture with the user A's mobile device. In response to the selection and gesture, the content A1 rendering on user A's mobile device is transmitted to the main device. The main device receives the content A1 transmitted by the user A's mobile device and begins to render the content A1 at the main display portion of the main device, as illustrated by the "Changed context" in FIG. 6B. In addition to rendering the transmitted content, user A's icon may also be rendered in a portion 601 of the main device's display to identify the user sharing the content. In this embodiment, the content that is being shared is marked for public sharing.

In addition to sharing content with other users, a user may retrieve content rendering on another user's device. As mentioned earlier, the content that is retrieved is identified/marked for sharing by the user from whom the content is being retrieved. The content that is being retrieved may be identified for sharing privately or publicly. In one embodiment, a user (user A) may select to view the content that is rendering on another user's (user B) mobile device, for example. In this embodiment, the content may be identified for private viewing or public viewing. As a result, user A may select user B or user B's mobile device icon from the user interface rendering on user A's mobile device and provide a gesture with user A's mobile device to retrieve content, while continuing to select the icon associated with user B's mobile device. It should be understood that user A's mobile device and user B's mobile device have an established communication pairing with each other in order to allow sharing of content. If user B has elected to share the content rendering on his/her mobile device with user A, user A's action may be used to retrieve the shared content from user B's mobile device. In one embodiment, the user interface on the user A's mobile device may provide indicators of which users have elected to share their content with user A. In one example, the indicator may be in the form of active icons to indicate that the users represented by active icons have elected to share the content. The users that have elected not to share any content may, for example, have their respective icons greyed out on the user interface of user A's mobile device. Along similar lines, when user A elects to share content with other users, the user interface may identify users/user devices that are actively paired with user A's mobile device.

Figure 3:
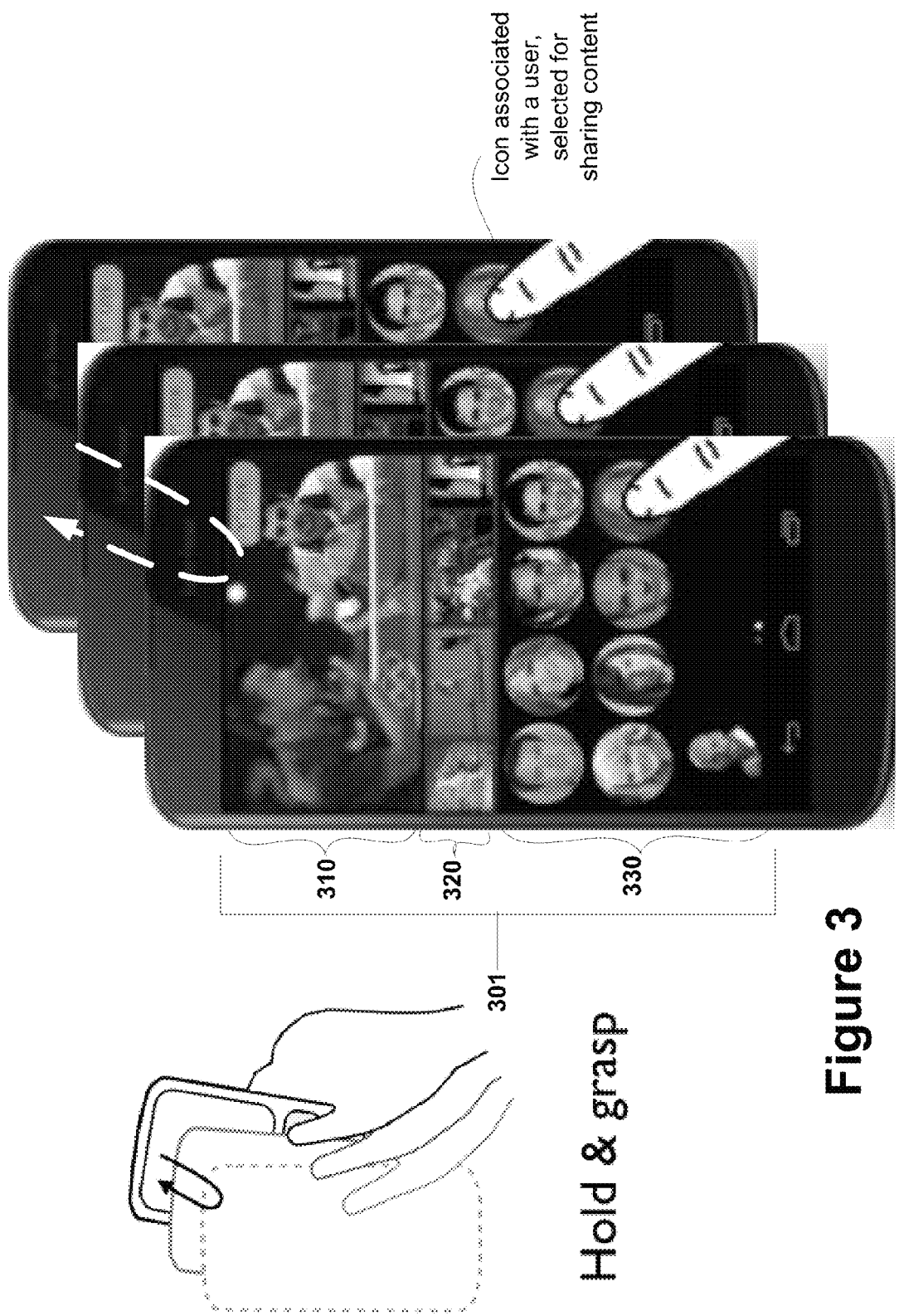
FIG. 3 illustrates an exemplary "hold-and-grasp" gesture performed at a user's device, in accordance with an embodiment of the present invention.

As a result of user A's selection of the icon associated with user B's device, the gesture recognition application may interpret the gesture as content request gesture and may activate the content retriever module 268a. In one embodiment, the gesture may be a "hold-and-grasp" gesture, as illustrated in FIG. 3. As illustrated, user A may select the icon associated with user B's mobile device and perform the hold-and-grasp gesture from user A's mobile device, requesting the content from user B. The content retriever module 268a within user A's mobile device identifies the selected device (user B's device), interprets the input gesture and sends out a request to user B's mobile device for the content. The content sharer module 268b in user B's mobile device receives the request, determines if the requested content is identified for sharing and transmits the content, when it is determined that the content is marked for sharing. In some embodiments, the content may be marked for sharing with only select ones of users. In this embodiment, the verification at user B's mobile device will determine if the content is marked for sharing with the selected user, user A, and upon successful verification, the content is shared with user A. As mentioned, the content may be targeted for either private sharing or public sharing. Content retrieved from user B is automatically rendered at the main display portion of user A's mobile device. As mentioned with reference to sharing of content, when content is retrieved from user B's device, a share indicator and/or a selection indicator may be activated at the respective mobile devices. For example, in user A's mobile device, the share indicator may be activated to indicate that the content is being retrieved from user B. Similarly, a selection indicator associated with the user B's mobile device icon may be activated at user A's mobile device. Along similar lines, user B's mobile device may have appropriate share indicator/selection indicator activated to indicate user A has requested content.

Figure 4:
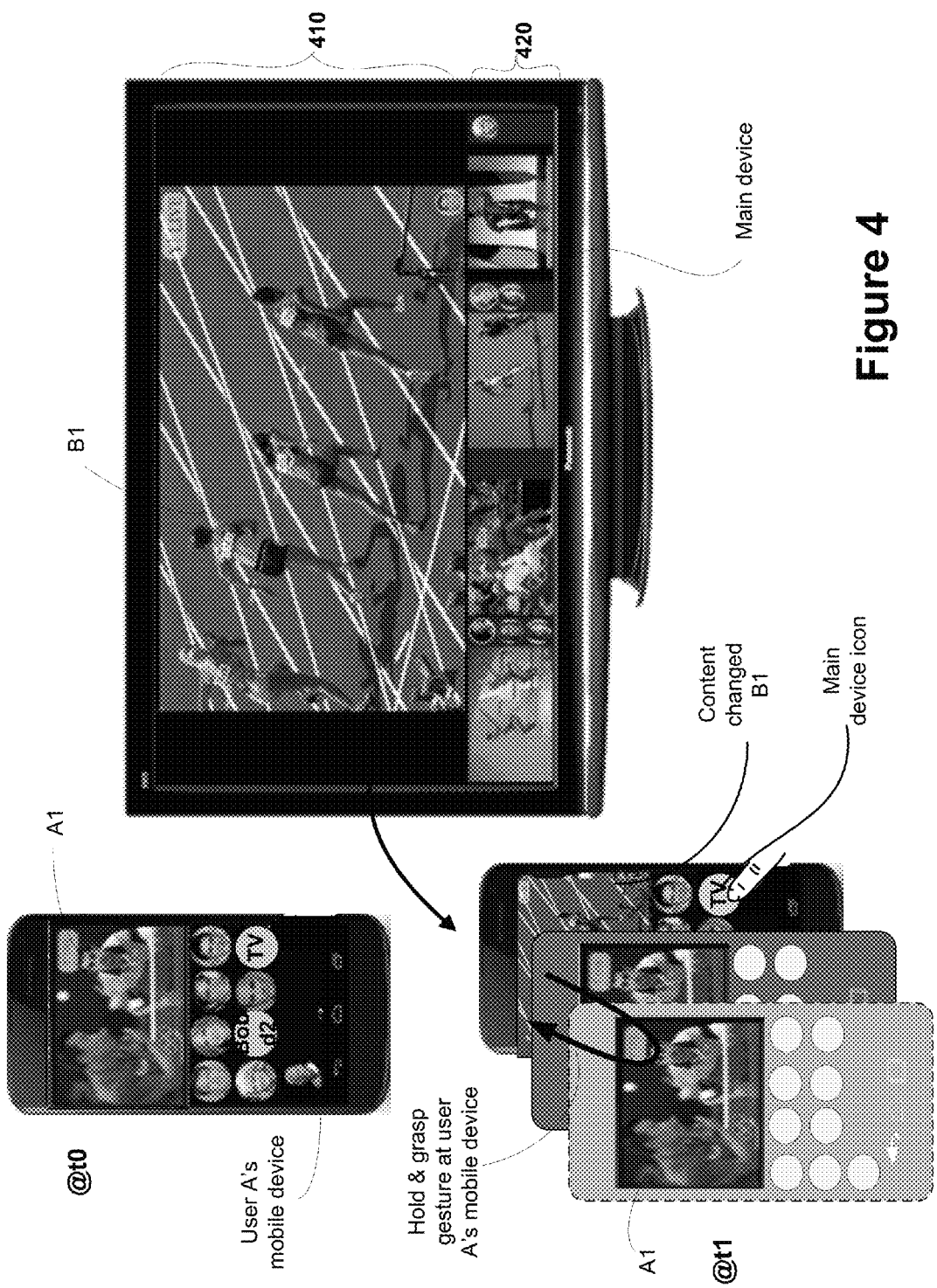
FIG. 4 illustrates an exemplary screen rendition related to content sharing from a main device to a user's mobile device, in accordance to an embodiment of the invention.

The embodiments are not restricted to retrieving content from another mobile device but can also be extended to retrieving content from a main device. FIG. 4 illustrates the before-and-after screen rendition of a mobile device retrieving content from a main device. As illustrated, at time t0, user A's mobile device is rendering content A1 related to a boxing match at the primary/main display area of the mobile device while the main device is rendering content B1 related to a Olympic relay race on its primary display area. At time t1, user A requests to retrieve content rendering on a the main device by selecting the main device's icon (represented as "TV" icon in FIG. 4) at the user interface on the user A's mobile device and performing a grasp gesture (similar to reeling in a fishing line, for example) using the user A's mobile device while continuing to select the main device, as illustrated in FIG. 4. The mobile device detects the device (i.e., main device) selected at the user interface of user A's mobile device, identifies and interprets the grasp gesture made with the user A's mobile device while the main device continues to be selected, and sends a request to the main device for the content. The main device receives the request and begins transmitting the content B1 to the user A's mobile device where it automatically renders in the display portion, as illustrated by the change in content rendering on user A's mobile device. In some embodiments, the main device needs to be co-located with user A's mobile device to allow such content sharing. In other embodiments, the main device does not have to be co-located. Further, with reference to retrieving content from the main device, there is no need to perform additional verification to determine if the requested content is selected for sharing, as the content that is rendered on the main device has already been shared for public viewing.

In another embodiment where a first multimedia content is already rendering in the first region 310 of the user A's mobile device, user selection of a second multimedia content thumbnail in a carousel section may cause the first multimedia content to cease rendering and cause the newly selected second multimedia content to begin rendering in the first region 310. The second multimedia content selected for rendering can then be shared privately with other users by sharing with the mobile devices of the other users or can be shared publicly by sharing the content on one or more other main devices associated with other users. Thus, the users are provided with the ability to view content privately with or without other users, as well as share content with other users publicly or privately. In one embodiment, the user is able to view multimedia content selected at the mobile device privately on the mobile device and simultaneously view other multimedia content rendered in the main screen of a main device that other users have shared publicly. In the aforementioned embodiments, "tap" gesture provides the playback within the mobile device and the "tap and hold" gesture allows the content to be shared with other users publicly.

In one embodiment, when a user selects a multimedia content from the carousel of thumbnails 320 for sharing with a main device, the shared multimedia content will appear as a thumbnail within a corresponding thumbnail portion 420 rendered at the bottom of the main device screen, as illustrated in FIG. 4. Similar to the carousel of thumbnails 320 identifying the content shared by users/content providers on the mobile device, the thumbnail portion 420 on the main device identifies a carousel of thumbnails of the multimedia content shared by a plurality of users publicly. Continuing to refer to FIG. 4, a main portion 410 within the display of the main device renders a multimedia content shared publicly.

Referring now to FIGS. 6A, 6B, the selected multimedia content that is rendering in the top region 310 of a user's mobile device is synchronized with the multimedia content rendering on the main portion 410 of the main screen 400. For simplicity sake, the main device illustrates only the main portion whereas in reality, the thumbnail portion is also included. The various embodiments described herein allow users to connect different living rooms and bring them together in a virtual living room. In one embodiment, the sharing of multimedia content can be done at different levels—i.e., based on social connectiveness or public sharing using user preferences. In one embodiment, the content presented in carousel portion (represented by reference numeral 320 of the mobile device of FIG. 2) may be a subset of a program guide of TV that shows the available TV shows at the main screen of the main device. In another embodiment, in addition to the TV shows, video streams, other content modules provided by other content providers, including promotional content providers, etc., or content that users have generated or have access to and/or are interested in sharing with other users, are also presented in the carousel portion 320. The other content can be social media streams (textual, video, audio, etc.), photos, or any content that is obtained from browsing the internet that a user is viewing or is interested in sharing.

Whenever content is shared by a user with the main device, the shared content will automatically populate the carousel portion 420 of the main device's display screen 400. The shared content is selected from the thumbnails of the carousel portion 320 of the user's mobile device. The thumbnail in the thumbnail portion 420 of the main device may also include an icon of a user that shared the content to the main device. The information in the carousel of thumbnail 420 on the main device thus provides the list of users that are currently viewing the multimedia content on their mobile devices and sharing the content with the main device. Similarly, whenever content is retrieved from a device (either from main device or from other mobile devices), the retrieved content will be automatically updated as a thumbnail in the carousel portion 320 of the mobile device of the user retrieving the content.

A thumbnail content 420 rendered on the main device may be promoted by one or more users sharing the content and such promotion may cause the selected thumbnail content to render at the main portion 410 of the display screen 400 of the main device. In one embodiment, the multimedia content from the thumbnail carousel 420 may be promoted for rendering in a full screen mode on the main device when sufficient number of user(s) share the multimedia content from the their respective mobile device. For example, a user wishing to share multimedia content with the main device may select the multimedia content from the thumbnail portion 320 of the user's mobile device and provide a hold-and-throw gesture (i.e., performing a throw gesture while continuing to select the main device). In response to the gesture, the selected multimedia content may be updated to the thumbnail portion 420 of the main device. In this example, the selected multimedia content may not be automatically rendered in the display portion of the main device. When sufficient number of users selects the same content for sharing with the main device, the multimedia content may be promoted from the thumbnail to rendering on the main display portion of the main device.

In another example, when multimedia content is selected for sharing with the main device, the user interface (UI) at the user's mobile device may detect the user input (for e.g., hold-and-throw gesture) at the user's mobile device and, in response, overlay an icon that provides options to select a full-screen or partial-screen mode for rendering the selected content at the main device. Based on the user input selection at the UI of the user's mobile device, the multimedia content is either rendered at the main display portion of the main device or updated as a thumbnail in the thumbnail section of the main device. When the rendering is on a main display portion, the content that was previously rendered on the main device is swapped with the shared multimedia content. The multimedia content that is shared with the main device is visualized as a multimedia content "stream". The previously rendered multimedia content that is swapped out may be updated as a thumbnail within the thumbnail section 420 of the main device while the shared content is rendered on the main device.

A user may be able to "un-share" the multimedia content that was selected for sharing with one or more main devices and/or one or more mobile devices by selecting the content, selecting the device from which to un-share and choosing a delete option from the user interface. The delete option may be provided as an overlay on the selected multimedia content rendered in the main portion of the user's mobile device. The overlay is an exemplary way of providing the option to delete and that other options such as a delete button, etc., may also be provided to allow the users to select to un-share the multimedia content from specific ones of the devices that the user shared the content with. In one embodiment, in order for the un-share option to work from the user's mobile device, the multimedia content selected for un-sharing should have been shared by the user.

The first time a user registers to the application, such as the device-side content sharing application, the user may be provided with an option on the user interface at the mobile device/main device to import his/her friend/social contact information. The client-side content sharing application of the mobile device may interact with the host server to obtain the social contact information for the user defined in the social network of one or more social media providers, present the social contact information in the form of device icons/user images, and provide the ability for the user to select specific ones of the social contact with whom the user wishes to share or retrieve multimedia content. Upon receiving selection of the social contacts from the user, the application may interact with the main devices data store and user devices data store to obtain the devices that are associated with each of the selected social contacts and present the information in the grid section. In one embodiment, the interaction with the main devices data store and/or user devices data store may lead to identifying devices that are communicatively paired with the user's mobile device. In another embodiment, all devices associated with the selected social contact may be identified. In this embodiment, when an identified device of a social contact does not have an established communication pairing with the mobile device of the user, an option may be provided at the user interface to communicatively pair the two devices. As mentioned earlier, the social contact may be contacts within the social circle of the user or may be users that share similar interest in the multimedia content as the user. As the user selects his/her friends/social contacts from the user interface, the icons of devices of the friends/social contacts or images of the social contacts are activated in the grid section of the user's mobile device.

The user may also be provided with a list of multimedia content that are available to the user on the mobile device for viewing and sharing with devices (i.e., main or mobile devices) of other users. In one embodiment, the list of multimedia content may be an extract of a TV guide that lists the content that is available to the user based on subscription with one or more content providers, content generated by the user, such as photos, annotations, images, social media content, etc., content generated by other users for the user account, such as social media streams, etc., promotional content, etc. The content may be provided in the second region 320 (i.e., thumbnail section) of the display screen of the mobile device as thumbnails.

In one embodiment, the user may be able to share the multimedia content with other users or retrieve multimedia content from other users' devices using the user interface in the mobile device. The user may select to share a multimedia content currently rendering on the user's mobile device by selecting specific ones of the icons in the grid, and perform a throw gesture to share the selected multimedia content with the device associated with the selected icon in the grid. The selected icon may correspond with a device associated with a social contact, a plurality of devices associated with one or more social contacts, a social contact, or a group of social contacts. As a result, the multimedia content selected for sharing is transmitted to the appropriate device(s) associated with the selected icon. In one embodiment, the content transmitted to the second device may not automatically render at the primary display portion of the second device. Instead, the content may be updated as a thumbnail at the thumbnail section. Upon successful transmission of the content to the second device, an appropriate share indicator of the user sharing the content may be activated (for e.g., highlighting the icon of the sharing user) at the user interface on the second device, and a request to view the shared content may be presented at the display portion of the second device. When the second user selects to view the shared content, the shared content may then be rendered at the display portion of the second device. The sharing of the content may involve switching content that is currently being rendered at the second device with the shared content.

In one embodiment, the user may elect to retrieve content rendering on a second device instead of sharing content with the second device. In this embodiment, the user may select an icon from the grid section of the user's mobile device and perform a grasp gesture while continuing to select the icon. In response to the grasp gesture, multimedia content from the device associated with the selected icon is retrieved. The retrieved multimedia content is automatically rendered on the main display portion of the mobile device of the user.

In one embodiment, a user may choose to view one of the shared multimedia content "streams" on their own mobile device. The shared streams, in this embodiment, are the ones that were shared publicly by users by moving them to at least one of the main devices for rendering. In this embodiment, the user may seek to obtain the content from the main device by selecting the main device from the grid and providing a grasp gesture. The grasp gesture is similar to reeling-in of a fishing line. The grasp gesture is interpreted at the mobile device and a request for the content is transmitted to the main device. A portion of the content sharing logic on the main device interprets the request and begins transmitting the multimedia content to the mobile device of the user. It should be noted that in order for the request and the content to be transmitted to and from the main device, the mobile device of the user should have been communicatively paired with the main device. The user is thus able to access content viewed by other users as well as share content with the other users who are actively participating, either privately or publicly, by accessing the content sharing logic application.

In one embodiment, when a user initially registers to the content sharing application using the device-side application, the thumbnail portion 320 may not be populated. After the user registers to the application, content that is available to the user account may begin to populate thumbnails in the carousel portion defined in the display region of the mobile device. The user may opt to view selective content from the carousel of thumbnails privately. If the user, watching a multimedia content, decides to share the multimedia content with other users publicly, the user selects a main device and provides a share gesture, in the form of a throw gesture, while selecting the main device. In response to the share gesture, the content (i.e., TV show or other content) rendering on the mobile device will automatically populate as a thumbnail at the thumbnail portion 420 on the main screen 400 of the main device. If the user wishes to share the content privately with other users, the user may select the mobile devices or icons of the other users, and perform the share gesture. In response to the share gesture, the shared content may automatically populate as a thumbnail in the thumbnail portion 320 on the other user's mobile devices. A selection indicator may be activated, in response to the selection of the device for sharing the content. The selection indicator may be in the form of highlighting the device icon in the grid section rendered in the display portion of the mobile device of the sharing user. Alternately, the selection indicator may be in the form of textual content, audio content, etc., rendered on the main portion of the mobile device.

In one embodiment, a share indicator may be activated at the shared device, in response to the share gesture. The share indicator, in one embodiment, may be in the form of highlighting the thumbnail that was created for the shared content in the carousel section of the shared device. In one embodiment, the shared content may be populated in the carousel section of the mobile device of other users, even if the other users are not watching any TV or content or are not actively participating. The shared content is rendered on the shared device when the other user accesses the application. The content provided to the other users is a curated version of the multimedia content available to a user.

When a user of a mobile device has lots of friends/social contacts, the application may select the devices of social contacts the user has most recently shared content and present them in a ranking order in the grid. Alternately, the application may promote devices/social contacts that the user has shared the content most of the time. In another embodiment, the user is provided with a user interface to select the criteria for prioritizing the devices of the social contacts so that the application can present the devices of social contacts for sharing the content in decreasing order of priority. In one embodiment, the thumbnail in the carousel bar can be customized for each device of the user based on the attributes of the entity/user sharing the multimedia content.

The mobile device can be a mobile phone, table PC, desktop, laptop, or any other internet connected computing device. Touch screen, single click, double click, etc., can be used as part of user action for selecting the content from the carousel of thumbnail. When sharing the content, in one embodiment, the application provides an option to define the size of display for the selected content to be viewed in full screen mode or partial screen mode, in a landscape mode or portrait mode at the display portion of the shared device. The application may use sensors built into the mobile device to influence the size and rendering mode for the selected shared content. In one embodiment, the application may allow the selected multimedia content to be rendered in the main/primary section 310 of the shared mobile device's display screen and let the user provide user input to adjust the amount of content and format (landscape or portrait) for rendering the content.

The application thus provides some level of flexibility in allowing a user to control what is being shared on the main device/mobile device of other users and what is retrieved from the main device/mobile device of other users. In another embodiment, when more than one user is sharing the same content on the main device, the shared content is rendered as a thumbnail in the thumbnail portion 420 of the main device and the icons of the shared users is provided alongside to allow other users to view who recommended the shared content for public viewing.

In one embodiment, a user need not have to be proximate to the main device/mobile devices or be co-located in the same location as the main device/mobile devices to share or retrieve the content. User selection of the device at his/her mobile device and the gesture for sharing/retrieving may be used to transmit the shared/retrieved content to/from the respective devices. In response to the sharing of the content, an informational message stating, for example, "User A is sharing the content for viewing in the main portion of the screen of the main or mobile device. Would you like to accept the content?" or some such informational message/share indicator may be presented at the respective device with which the user is sharing the content. Similar such informational message/share indicator may be provided when a user of a mobile device is trying to retrieve content from another device. Based on the user action in response to the informational message/share indicator, the content sharing/retrieving is enabled.

Figure 7A:
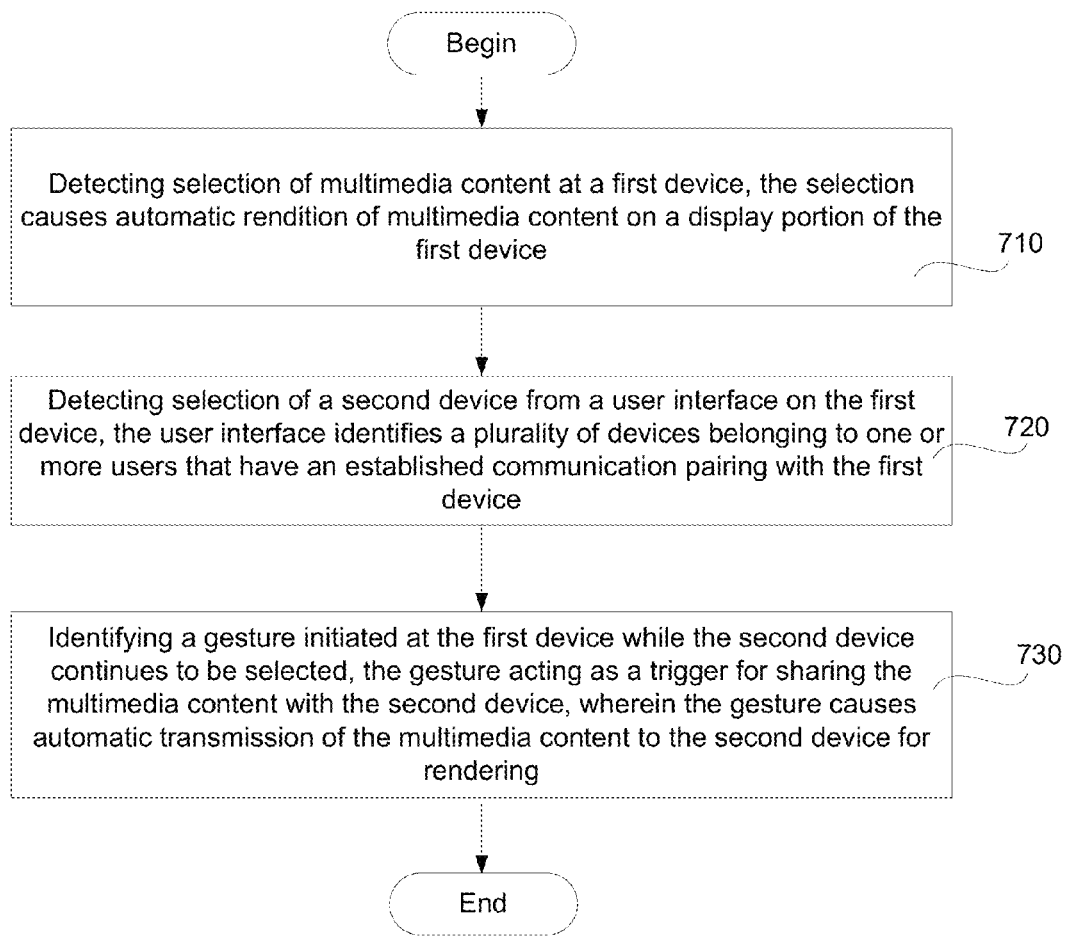
FIGS. 7A and 7B illustrate a flow chart identifying method operations followed for sharing and retrieving multimedia content, in accordance with different embodiments of the invention.

FIG. 7A illustrates method operations for sharing multimedia content, in one embodiment of the invention. The method begins at operation 710 when selection of multimedia content is detected at a first mobile device. The multimedia content may be selected from a carousel of thumbnails that identify multimedia content that are available to the first mobile device of the user based on user's subscription to the multimedia content, content shared by other users, content generated by the user, content generated by other content sources including promotional content, etc. The selection causes the multimedia content to be automatically rendered at a main display portion of the first mobile device.

A selection of a second device is detected on a user interface (UI) on the first mobile device on which a plurality of devices associated with other users are rendered, as illustrated in operation 720. The UI on the mobile device is used to render images of a plurality of users or icons of plurality of devices associated with the one or more users in a grid format. The second device may be selected by selecting the appropriate icon/image from the grid portion of the user interface. The second device may be a mobile device or a main device that is paired to the first mobile device. The main device is used to render publicly viewable multimedia content while the mobile device is used to render either publicly viewable or privately viewable multimedia content. The first mobile device is configured to access the content provided by one or more content sources/users over a network and share the content with the selected second device.

A gesture made with the first mobile device while the second device continues to be selected, is identified, as illustrated in operation 730. The gesture is interpreted to determine the first mobile device user's intention for the selected multimedia content. When it is determined that the user intends to share the selected multimedia content with the selected second device, the sharing operation is triggered. The sharing operation includes automatic transmission of the selected multimedia content from the first mobile device to the second device. In one embodiment, upon successful transmission of the selected multimedia content, the shared multimedia content is rendered at the main display portion of the second device. In an alternate embodiment, upon successful transmission, a carousel portion of the second device may be updated with the shared multimedia content as a thumbnail. In this embodiment, an informational message may be rendered on the display portion of the second device indicating that multimedia content is being shared by a first user. If the second user wishes to view the shared content, he/she may select the thumbnail from the carousel portion and the selection causes automatic rendition of the multimedia content at the display portion of the second device.

Figure 7B:
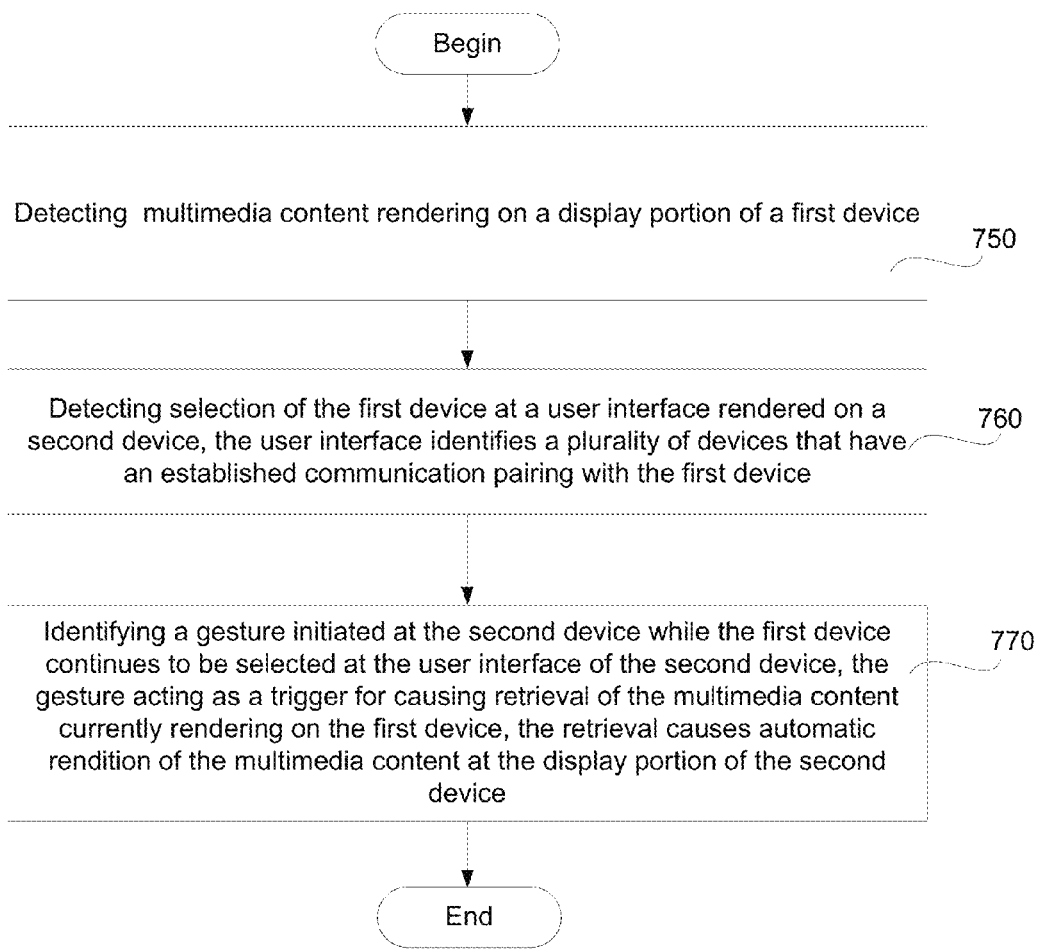

FIG. 7B illustrates method operations for retrieving multimedia content, in one embodiment of the invention. The method begins at operation 750 with the detection of multimedia content rendering on a display portion of a first device. The first device may be a mobile device or a main device, such as a television, that has established communication pairing with other devices, including a second mobile device. A selection of the first device is detected at a user interface rendered on the second mobile device, as illustrated in operation 760. The user interface rendered at a display portion of the second mobile device includes a grid portion with a plurality of icons representing users or plurality of devices associated with one or more users. An appropriate icon (of a user or the device) associated with the first device is selected from the grid portion of the user interface.

A gesture made with the second mobile device while the first device continues to be selected at the user interface of the second device. The gesture is detected, as illustrated in operation 770. The detected gesture is interpreted to determine the second mobile device user's intention of sharing multimedia content. When it is determined that the user intends to retrieve the multimedia content rendering on the selected first device, a retrieval operation is triggered. The retrieval operation includes transmission of a request to the first device for the multimedia content currently rendering on its display portion. In one embodiment, in response to receiving the request, an informational message or any form of share indicator may be generated and rendered on the first device indicating that the second mobile device is requesting the multimedia content. The informational message may be in textual format, haptic format, graphical user interface format, audio format, etc. In response to the request, the content sharing application within the first device interprets the request, determines if the multimedia content requested is set up for sharing with other users, and when the multimedia content is set up for sharing, transmitting the multimedia content to the second mobile device. Upon successful transmission of the selected multimedia content, the multimedia content is automatically rendered at the main display portion of the second mobile device. An informational message/share indicator may be rendered on the display portion of the second mobile device informing a user the successful retrieval of the multimedia content from the first device. The user of the second mobile device may elect to share the retrieved content with other users, at which time, the method operations of FIG. 7A may be followed.

The various embodiments described herein define an application tool that provides an interface that can be extended to define a virtual living room for TV watching. The application tool allows the devices, such as mobile devices, to share content with other mobile devices and with the main devices, as well as retrieve content from other devices. The application tool provides a mechanism to interpret the various gestures made with a mobile device and provide the required content at the selected ones of devices of users, wherein the selected ones of devices may be mobile devices or main devices, such as a television.

As mentioned earlier, the gesture recognition application may be used to provide an innovative way of interpreting interactions between two users when they are accessing an interactive application, such as a interactive game. A first user may first access the interactive game content (such as an online chess game, for example), provide input that influences outcome of the game and then share the updated game with a second user. The second user may provide his own interactions to the game further influencing the outcome of the game and share the updated game with the first user. The first user and the second user continue to interact with the game and exchange the updated version of the game with one another making an interesting game play. The back and forth interaction may be captured and shared with other users. In another embodiment, a user may play an interactive game and share his/her gameplay with other users. In this embodiment, the gameplay sharing may be accompanied with an invitation to the other users to try their game playing skills and request the other users to share their gameplay with the other users. Alternately, a second user may be interested in the gameplay of the first user and may send a request for retrieving the content from the first user. The second user may view the gameplay content and attempt to play the game and share the content with the first user and/or with other users, making for interesting gameplay. As can be seen, the application tool provides different ways of sharing and retrieving content for collaborative viewing.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. A sample computer system identifying the backend server infrastructure used to power the content host server 200 of FIG. 1, is depicted in FIGS. 8A-8C.

Figure 8A:
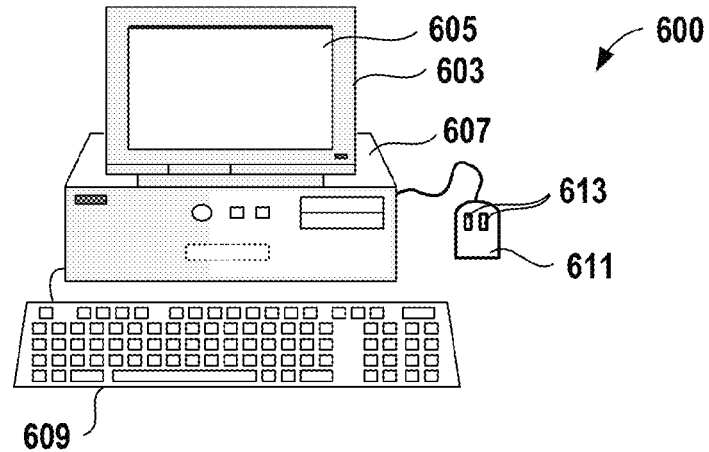
FIG. 8A is a generalized diagram of a typical computer system suitable for use with the present invention.

In FIG. 8A, is an illustration of an embodiment of an exemplary computer system 600 suitable for use with the present invention including display 603 having display screen 605. Cabinet 607 houses standard computer components (not shown) such as a disk drive, CDROM drive, display adapter, network card, random access memory (RAM), central processing unit (CPU), and other components, subsystems and devices. User input devices such as a mouse 611 having buttons 613, and keyboard 609 are shown. Other user input devices such as a trackball, touchscreen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 8B:
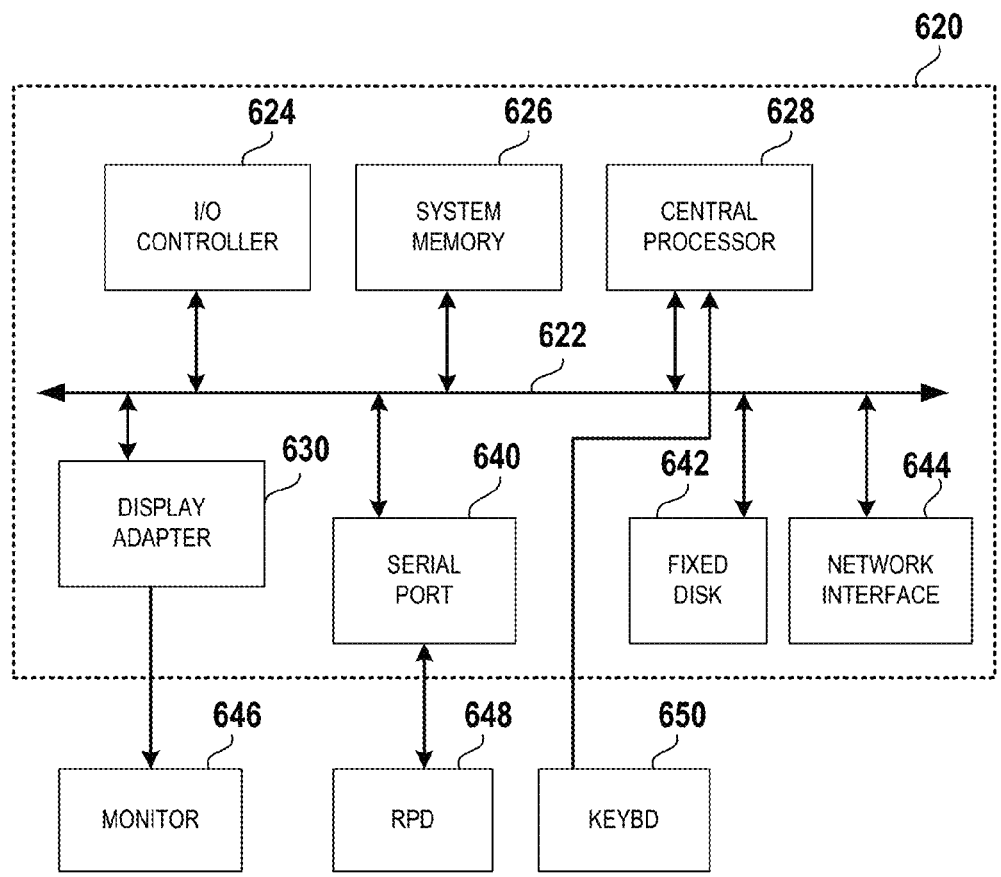
FIG. 8B shows subsystems in the typical computer system of FIG. 8A.
Figure 8C:
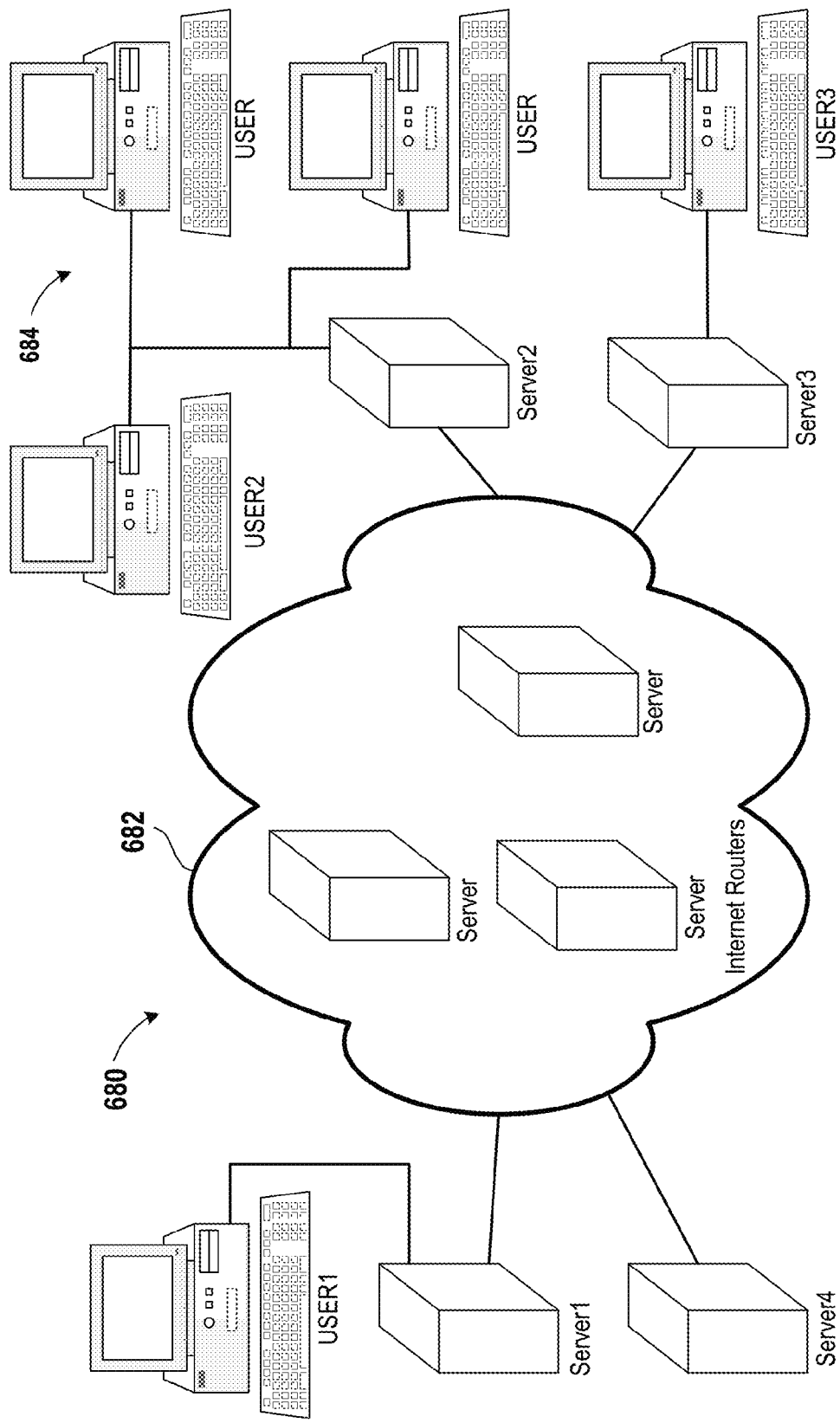
FIG. 8C is a generalized diagram of a typical network suitable for use with the present invention.

FIG. 8B illustrates an exemplary subsystems that might typically be found in a computer such as computer 600. In FIG. 8B, subsystems within box 620 are directly interfaced to internal bus 622. Such subsystems typically are contained within the computer system such as within cabinet 607 of FIG. 8A. Subsystems include input/output (I/O) controller 624, System Random Access Memory (RAM) 626, Central Processing Unit (CPU) 628, Display Adapter 630, Serial Port 640, Fixed Disk 642 and Network Interface Adapter 644. The use of bus 622 allows each of the subsystems to transfer data among the subsystems and, most importantly, with the CPU. External devices can communicate with the CPU or other subsystems via the bus 622 by interfacing with a subsystem on the bus. Monitor 646 connects to the bus through Display Adapter 630. A relative pointing device (RPD) 648 such as a mouse connects through Serial Port 640. Some devices such as a Keyboard 650 can communicate with the CPU by direct means without using the main data bus as, for example, via an interrupt controller and associated registers (not shown).

As with the external physical configuration shown in FIG. 8A, many subsystem configurations are possible. FIG. 8B is illustrative of but one suitable configuration. Subsystems, components or devices other than those shown in FIG. 8B can be added. A suitable computer system can be achieved without using all of the subsystems shown in FIG. 8B. For example, a standalone computer need not be coupled to a network so Network Interface 644 would not be required. Other subsystems such as a CDROM drive, graphics accelerator, etc. can be included in the configuration without affecting the performance of the system of the present invention.

FIG. 8C is a generalized diagram of a typical network. In FIG. 8C, the network system 680 includes several local networks coupled to the Internet. Although specific network protocols, physical layers, topologies, and other network properties are presented herein, embodiments of the present invention are suitable for use with any network.

In FIG. 8C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of server routers 682. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 684 are shown utilizing a local network at a different location from USER1 computer. The computers at 684 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, carrier wave, or computer memory. The computer readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for sharing multimedia content, comprising:
    detecting selection of multimedia content at a first device, the selection causing the multimedia content to be automatically rendered on a display portion of the first device;
    detecting selection of an icon of a second device from a user interface on the first device, wherein the user interface identifies icons of a plurality of devices belonging to one or more users that have an established communication pairing with the first device; and
    identifying a gesture made with the first device while the icon of the second device continues to be selected at the first device, the gesture acting as a trigger for sharing the multimedia content currently rendering on the first device with the second device, the gesture causing the multimedia content to be automatically transmitted to the second device for rendering at a display of the second device, wherein the gesture is a hold-and-throw gesture defined as a combination of a hold action and a throw action, wherein the throw action is performed with a physical action of movement of the first device away from a user providing the gesture while the icon of the second device continues to be selected at the first device with the hold action, and
    wherein the operations are performed by a processor.

2. The method of claim 1, wherein each of the plurality of icons represents one of a distinct second device, a user associated with the distinct second device, a group of distinct second devices, or a group of users associated with the distinct second devices that have established communication pairing with the first device.

3. The method of claim 2, wherein each of the icons is associated with a selection indicator such that the selection of a particular icon from the icons causes the selection indicator of the particular icon to be activated for duration of the selection.

4. The method of claim 1, further includes updating a share indicator at the first device in response to sharing of the multimedia content with the second device.

5. The method of claim 4, wherein the share indicator is any one of a haptic feedback, a text box, a check box, an audio feedback, a static image, an animated image, or any combinations thereof.

6. The method of claim 1, wherein the first device is a mobile computing device.

7. The method of claim 1, wherein the second device is one of a television used for rendering the selected multimedia content publicly or a mobile computing device used for rendering the selected multimedia content privately.

8. The method of claim 1, further includes defining attributes for the multimedia content for private sharing.

9. The method of claim 1, further includes defining attributes for the multimedia content for public sharing.

10. The method of claim 1, wherein the communication pairing between the first device and the second device is established using a streaming protocol.

11. The method of claim 1, wherein rendering at the display further includes promoting the multimedia content shared by a user with a main device for rendering in a main portion based on number of other users that have shared the multimedia content, wherein the second device is a main device.

12. The method of claim 1, wherein the multimedia content includes multimedia content provided by one or more content providers, multimedia content generated and shared by the user initiating the selection of the second device, multimedia content generated and shared by one or more other users, or any combinations thereof.

13. A method for retrieving multimedia content, comprising:
    detecting multimedia content being rendered on a display portion of a first device;
    detecting selection of an icon of a second device at a user interface rendered on the first device, wherein the user interface identifies icons of a plurality of devices that have established communication pairing with the first device; and
    identifying a gesture made with the first device while the icon of the second device continues to be selected at the user interface of the first device, the gesture acting as a trigger causing retrieval of the multimedia content currently rendering on the second device, the retrieval causing the multimedia content to be rendered at the display portion of the first device, wherein the gesture is a hold-and-grasp gesture defined as a combination of a hold action and a grasp action, wherein the grasp action is performed with a physical action of movement motion of the first device toward a user providing the gesture while the icon of the second device continues to be selected at the first device with the hold action, and
    wherein the operations are performed by a processor.

14. The method of claim 13, wherein the multimedia content is shared multimedia content.

15. The method of claim 13, wherein each of the plurality of icons representing a distinct device or a user representing the distinct device that has multimedia content for sharing.

16. The method of claim 13, wherein the second device is a television or a mobile computing device.

17. The method of claim 13, wherein the first device is a mobile computing device.

18. A system for sharing multimedia content, comprising:
    a client device configured to render multimedia content on a display portion of the client device, the client device equipped with a gesture recognition application configured to be executed on a processor associated with the client device, the gesture recognition application including,
    a device selector module configured to detect selection of an icon of a second device from a user interface rendered at the display portion of the client device and to activate a selection indicator for the selected second device at the user interface;
    a gesture interpreter configured to detect gesture made with the client device while the icon of the second device continues to be selected on the user interface and triggering sharing of the multimedia content between the client device and the second device, wherein the sharing of the multimedia content includes transmitting the multimedia content to the second device for rendering at the display portion of the second device when the gesture is a hold-and-throw gesture defined as a combination of a hold action and a throw action, wherein the throw action is performed with a physical action of movement of the client device away from a user providing the gesture while the icon of the second device continues to be selected at the client device with the hold action, or retrieving the multimedia content currently rendering on the second device for automatic rendition at the display portion of the client device, when the gesture is a hold-and-grasp gesture defined as a combination of a hold action and a grasp action, wherein the grasp action is performed with a physical action of movement of the client device toward the user providing the gesture while the icon of the second device continues to be selected at the client device with the hold action.

19. The system of claim 18, wherein the client device is a mobile device and the second device is one of mobile device or a television.

\* \* \* \* \*